United States Patent
Chrysanthakopoulos

(10) Patent No.: US 11,803,244 B2
(45) Date of Patent: Oct. 31, 2023

(54) WRITING INSTRUMENT

(71) Applicant: BIC Violex Single Member S.A., Anoixi (GR)

(72) Inventor: Nikolaos Chrysanthakopoulos, Anoixi (GR)

(73) Assignee: BIC Violex Single Member S.A., Anoixi (GR)

( * ) Notice: Subject to any disclaimer, the term of this patent is extended or adjusted under 35 U.S.C. 154(b) by 0 days.

(21) Appl. No.: 18/154,910

(22) Filed: Jan. 16, 2023

(65) Prior Publication Data
US 2023/0229238 A1 Jul. 20, 2023

(30) Foreign Application Priority Data
Jan. 17, 2022 (EP) .................... 22151754

(51) Int. Cl.
| | | |
|---|---|---|
| G06F 3/01 | (2006.01) | |
| G06F 3/0354 | (2013.01) | |
| G06F 3/038 | (2013.01) | |
| G06F 3/044 | (2006.01) | |

(52) U.S. Cl.
CPC ............ G06F 3/016 (2013.01); G06F 3/0383 (2013.01); G06F 3/03545 (2013.01); G06F 3/044 (2013.01)

(58) Field of Classification Search
None
See application file for complete search history.

(56) References Cited

U.S. PATENT DOCUMENTS

| | | |
|---|---|---|
| 9,164,598 B2 | 10/2015 | Pedersen et al. |
| 2014/0092069 A1 | 4/2014 | Bentov |
| 2016/0282970 A1 | 9/2016 | Evreinov et al. |
| 2019/0384402 A1 | 12/2019 | Huizar et al. |
| 2020/0159342 A1* | 5/2020 | Gray .................. G06F 3/03545 |

FOREIGN PATENT DOCUMENTS

WO 2017106044 A1 6/2017

OTHER PUBLICATIONS

Extended European Search Report issued in EP 22 15 1754.3 dated Jul. 2, 2022 (10 pages).
Hwang Inwook et al: "A Light-Driven Vibrotactile Actuator with a Polymer Bimorph Film for Localized Haptic Rendering", Applied Materials & Interfaces, vol. 13, No. 5, Jan. 20, 2021 (Jan. 20, 2021), pp. 6597-6605, XP055937317, us ISSN: 1944-8244, DOI: 10.1021/acsami.0c19003.

* cited by examiner

*Primary Examiner* — Stephen T. Reed
(74) *Attorney, Agent, or Firm* — Bookoff McAndrews, PLLC

(57) ABSTRACT

A writing instrument configured to provide tactile feedback to a user, comprising an elongate body portion enabling a user to grip the writing instrument, wherein the body portion comprises a proximal end and a distal end, the proximal end comprising a source of infra-red radiation to illuminate, in use, an active region of a writing surface; and a controller configured to generate a control signal for controlling the source of infra-red radiation. The source of infra-red radiation, driven by the control signal, emits infra-red radiation having a spectral maximum in wavelength range capable of activating thermal bimorph polymer material, and wherein, in use, the proximal end of the writing instrument, when in contact with the active region of the writing surface transfers a tactile impulse generated by the active region of the writing surface to the user via the elongate body portion.

19 Claims, 5 Drawing Sheets

WRITING INSTRUMENT

This application claims priority from European patent application No. 22151754.3, filed on Jan. 17, 2022, the contents of which are hereby incorporated herein in their entirety by this reference.

TECHNICAL FIELD

The embodiments described in the following disclosure relate to a writing instrument configured to provide tactile feedback to a user, and an associated writing surface, writing system, apparatus, and method.

BACKGROUND

Some options for writing or drawing on a substrate include the use of a pen and permanent ink to write on paper, the use of pencil to write on paper, or the use of a non-permanent ink to write on a whiteboard surface, for example the BIC Velleda™ whiteboard.

Modern consumers are typically becoming more interested in personalised writing products having added functionality. Such products can be personalised to the needs of individual users. Furthermore, writing options enabling re-use of the writing media may increase in importance as environmental concerns continue to increase in prominence.

The sensation that a user experiences when writing on a surface is a significant aspect of the writing experience. The sensation typically arises from mechanical displacement of a pen nib as it is traced over a surface having a degree of roughness, such as paper. However, reusable writing tablets typically have a smooth writing surface provided as a plastic or glass tablet. The haptic experience from reusable writing tablets may, therefore, be further improved.

SUMMARY

According to a first aspect, there is provided a writing instrument configured to provide tactile feedback to a user. The writing instrument comprises an elongate body portion enabling a user to grip the writing instrument. The body portion comprises a proximal end and a distal end. The proximal end comprises at least a source of infra-red radiation configured to illuminate, in use, an active region of a writing surface. The writing instrument comprises a controller configured to generate a control signal for controlling the source of infra-red radiation. Upon being driven by the control signal, the source of infra-red radiation is configured to emit infra-red radiation having a spectral maximum in a wavelength range capable of activating a thermal bimorph polymer material. In use, the proximal end of the writing instrument, when in contact with the active region of the writing surface, is configured to transfer a tactile impulse generated by the active region of the writing surface to the user of the writing instrument via the elongate body portion.

Haptic sensations provided to a user of a writing instrument are an important attribute. Writing on a plasticised notebook surface, for example, provides a user with a different haptic sensation compared to writing on conventional paper. Providing haptic features can enhance the educational experience, for example by providing children with the impression of colouring over differently shaped textured materials. Another important application of haptic feedback is enabling children, and partially sighted or blind people, to write in-between the lines of a ruled writing medium. Furthermore, haptic feedback or varied textures can provide users with distinct sensations related to different parts of an image, for example.

According to the aspects of the present specification, haptic feedback may be provided to the user of a writing implement when writing on a conventional writing surface. Furthermore, when writing on a reusable writing surface such as a plastic or glass tablet, a texture similar to a conventional paper writing surface can be provided. The writing surface of the vibrating material is passive, and thus a power source in an associated writing tablet is not essential.

According to a second aspect, there is provided a writing surface for use with a writing instrument configured to provide tactile feedback to a user, comprising a substrate and an active region disposed on at least a portion of the substrate. The active region comprises a thermal bimorph polymer material capable of being activated by infra-red radiation.

According to a third aspect, there is provided an apparatus comprising a data memory, a data modem, a processor, and a visual interface.

The processor of the apparatus is configured to communicate, via the data modem (54), with a controller of a writing instrument according to the first aspect, or its embodiments.

The processor of the apparatus is configured to communicate, via the data modem, with a processor of a writing surface according to the second aspect, or its embodiments.

The processor is configured to operate in a first mode, comprising communicating with the processor of the writing surface to obtain the configuration data record defining the writing surface, and transmitting the configuration data record to the controller of the writing instrument based on the data record defining the writing surface, or the processor is configured to operate in a second mode, comprising obtaining from the user application executed on the processor and displayed on the visual interface of the apparatus, a spatial configuration and/or a texture configuration, generating a configuration data record based on the spatial configuration and/or a texture configuration provided by the user, and transmitting the configuration data record to the controller of the writing instrument.

According to a fourth aspect, there is provided a writing system configured to provide tactile feedback to a user. The writing system comprises a writing instrument according to the first aspect, or its embodiments, and a writing surface according to the second aspect, or its embodiments.

According to a fifth aspect, there is provided a method for writing on a writing surface using a writing instrument configured to provide tactile feedback to a user, comprising:
  orienting a writing instrument according to the first aspect or its embodiments, such that the proximal end of the writing instrument emits, in use, infra-red radiation that is incident on an active region of a writing surface according to the second aspect, or its embodiments;
  generating a control signal for controlling the source of infra-red radiation; and
  displacing the writing instrument across the active region, thereby activating the thermal bimorph polymer material comprised in the active region of the writing surface to generate tactile feedback.

In this specification and claims, the term "proximal end" means an end of a stylus that, in use, is held closest to a writing medium compared to the "distal end" of the stylus.

In this specification, the term "writing implement" refers to a stylus containing, at the proximal end, an infra-red source that can be held by a user, to cause a thermal bimorph polymer material to activate. However, such a writing implement may, in an exemplary embodiment also comprise, at the proximal end, an ink stylus nib, leaded pencil tip, and the like.

In the following application, a "micro LED" (also known as an "mLED" or "µLED") is a microscopic light emitting diode having an enhanced contrast, response time, and energy efficiency. micro LEDs are intended for relatively small, low-energy devices such as virtual reality headsets, smartwatches, and smartphones. micro LEDs have reduced energy requirements compared to conventional LCDs, whilst also offering an infinite contrast ratio. micro LEDs are inorganic, and thus have a long lifetime. In an example, micro LEDs are available with a cross sectional dimension of 4 µm, with 10 times the resolution, 100 times the contrast ratio, and up to 1000 times the luminance of comparable OLEDs. In terms of chip sizes, light-emitting diode (LED) can be divided into three categories: traditional broad-area LEDs larger than 200 µm, mini-LEDs between 100 and 200 µm, and microLEDs smaller than 50 µm. They are made of inorganic semiconductor diodes like AlInGaN and AlInGaP, r InGaN. Microleds with very small sizes down to 4 µm are being developed, which offer 10× the resolution, 100× the contrast ratio, and up to 1000× the luminance at half the power consumption compared to OLEDs.

In the following application, the term "thermal polymer bimorph actuator" refers to an actuator comprising a broadband light absorption layer that expands when exposed to light of a predetermined wavelength. The broadband light absorption layer (in an example, a layer of PEDOT-Tos, p-toluenesulfonate-doped poly(3,4-ethylenedioxythiophene) is conjoined with a passive layer (such as of PET (polyethylene terephthalate) plastic). This causes the broadband light absorption layer to deform when it is exposed to light of a predetermined wavelength. For example, illuminating PEDOT-Tos with near infra-red light causes it to deform in the location of the incident illumination into a bump. Such a deformation is a result of the activation of the thermal polymer bimorph actuator. The infra-red-induced deformation is reversible, spatially localised, and rapidly controllable. Light can provide vibrotactile stimulation at arbitrary areas in a frequency range of up to 300 Hz, using a low input light power of approximately 2.6 mWmm$^{-2}$, for example.

This specification generally concerns a system for haptically assisted writing capable of inducing a surface texture to a specially coated substrate. In some cases, the surface texture may be user-defined. The system comprises a writing surface coated with a thermal bimorph polymer material, and a writing instrument comprising an infra-red or near infra-red optical source. The interaction of these elements may deliver a customizable texture to a user when the writing instrument is used with the writing surface. Upon irradiation by infra-red or near infra-red light, the light energy absorbed by the active layer of the thermal bimorph polymer is converted into a thermoelastic bending deformation due, for example, to the mismatch in coefficient of thermal expansion between the active layer and its conjoined substrate. The heating and cooling cycle induced by a variable infra-red or near infra-red optical signal incident on the thermal bimorph polymer generates a repetitive thermoelastic bending deformation. The temperature of the illuminated region of thermal bimorph polymer is related to the time integral of the variable infra-red or near infra-red optical signal incident on the thermal bimorph polymer. Therefore, varying parameters such as the shape, duty cycle, amplitude of the haptic signal so as to provide different textures is possible. Provision of the thermal bimorph polymer on the writing surface is not essential. As will be discussed in one variant, a portion of the tip of the writing implement (that may contact a writing surface) may be coated with thermal bimorph polymer and be in optical contact with an infra-red light source at the tip of the writing implement. In this variation, the tip of the writing implement self-generates a vibration for haptic feedback.

BRIEF DESCRIPTION OF THE DRAWINGS

Other characteristics will be apparent from the accompanying drawings, which form a part of this disclosure. The drawings are intended to further explain the present disclosure and to enable a person skilled in the art to practice it. However, the drawings are intended as non-limiting examples. Common reference numerals on different figures indicate like or similar features.

DETAILED DESCRIPTION

Figure 1:
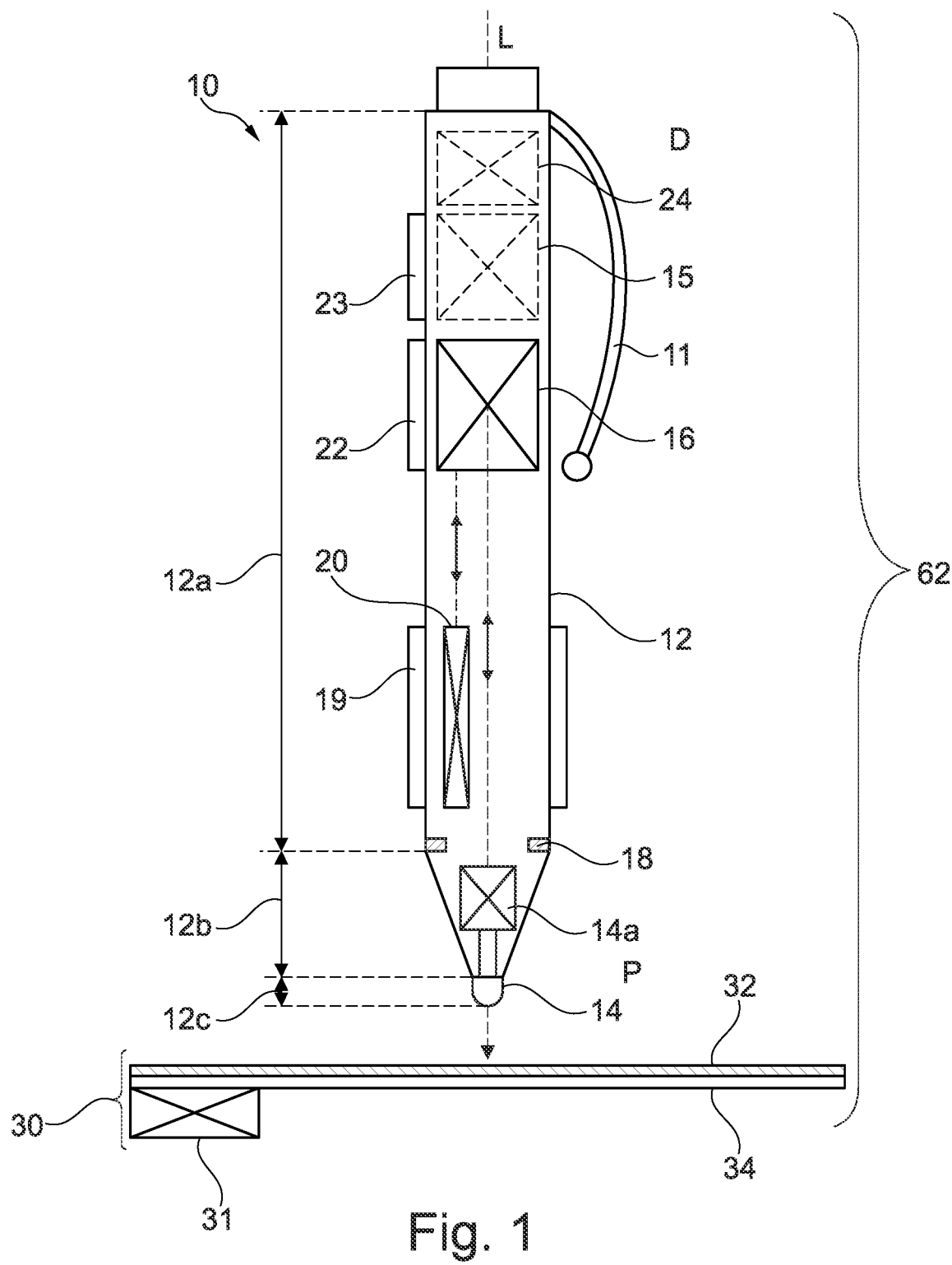
FIG. 1 schematically illustrates a longitudinal cross-section of a writing instrument.

According to the present specification, a writing instrument and writing surface are provided enabling a realistic texture feeling to be provided when writing on a plastic or glass surface, for example, using a photothermally driven passive vibrotactile polymer coating. Localised vibrations are induced in the photothermally driven passive vibrotactile polymer coating around the proximal end of the writing instrument using, for example, pulsing infra-red microLEDs at the proximal end of the writing instrument. In an example, the entire writing surface is covered with the photothermally driven passive vibrotactile polymer coating. In an example, the coating is applied in a pattern of one or more lines, for example, mimicking the placement of ruled lines on a sheet of lined paper.

In an exemplary use, a user may obtain a writing instrument in accordance with the first aspect, and a writing surface in accordance with the second aspect. The user initiates the source of infra-red radiation of the writing implement in a pattern that provides a desired pulsing pattern or texture when the source of infra-red radiation is held proximate to the writing surface. The writing instrument may comprise a proximity or pressure sensor configured to control the source of infra-red radiation as it approaches and touches the writing surface.

According to a first aspect, there is provided a writing instrument 10 configured to provide tactile feedback to a user. The writing instrument comprises an elongate body portion 12 enabling a user to grip the writing instrument. The body portion 12 comprises a proximal end P and a distal end D. The proximal end P comprises at least a source of infra-red radiation 14 configured to illuminate, in use, an active region of a writing surface 30. The writing instrument comprises a controller 16 configured to generate a control signal for controlling the source of infra-red radiation 14.

Upon being driven by the control signal, the source of infra-red radiation 14 is configured to emit infra-red radiation having a spectral maximum in a wavelength range capable of activating a thermal bimorph polymer material. In use, the proximal end P of the writing instrument 10, when in contact with the active region 32 of the writing surface 30, is configured to transfer a tactile impulse generated by the active region 32 of the writing surface to the user of the writing instrument via the elongate body portion 12.

FIG. 1 schematically illustrates a longitudinal cross-section of an exemplary embodiment of a writing instrument 10 according to the first aspect.

For example, the writing instrument 10 comprises an elongate body portion 12 divided into a tubular section of constant diameter 12a, a tapering body portion 12b, and a tip section 12c at the proximal end P. The tip section 12c may comprise a source of infra-red radiation 14 (such as a microLED), connected to a drive circuitry 14a capable of interfacing the source of infra-red radiation 14 to a controller 16. In an example, the elongate body portion 12 comprises a clip 11. Typically included within the elongate body portion are, for example, an electrical power source 15 capable of providing electrical energy to all electrical elements within the writing instrument 10. In some embodiments, an optional data modem 24, texture selector 22, display 23, and second sensor 20 proximate to a user grip 19 are provided. In some embodiments, a first sensor 18 functioning as a proximity or pressure sensor may also be provided.

In use, a user grips the writing instrument 10 and activates the source of infra-red radiation 14, for example by contact against a writing surface 30 detected by the first sensor 18, and/or by detection of the user grip event by second sensor 20. The controller 16 detects the contact against the writing surface 30, proximity to the writing surface, and/or the grip event using at least the first or second sensors, respectively. The controller 16 generates a control signal that causes the source of infra-red radiation 14 to emit light in a near-infra-red or infra-red wavelength. The active region 32 of the writing surface 30 deforms in response to exposure to the near-infra-red or infra-red light source. When the proximate end P of the pen is held in mechanical contact with the active region 32, the deformation exerts a force against the proximal portion of the writing instrument, causing a user to perceive a physical discontinuity on the writing surface 30 as the writing instrument 10 is displaced across the writing surface 30.

Figure 2:
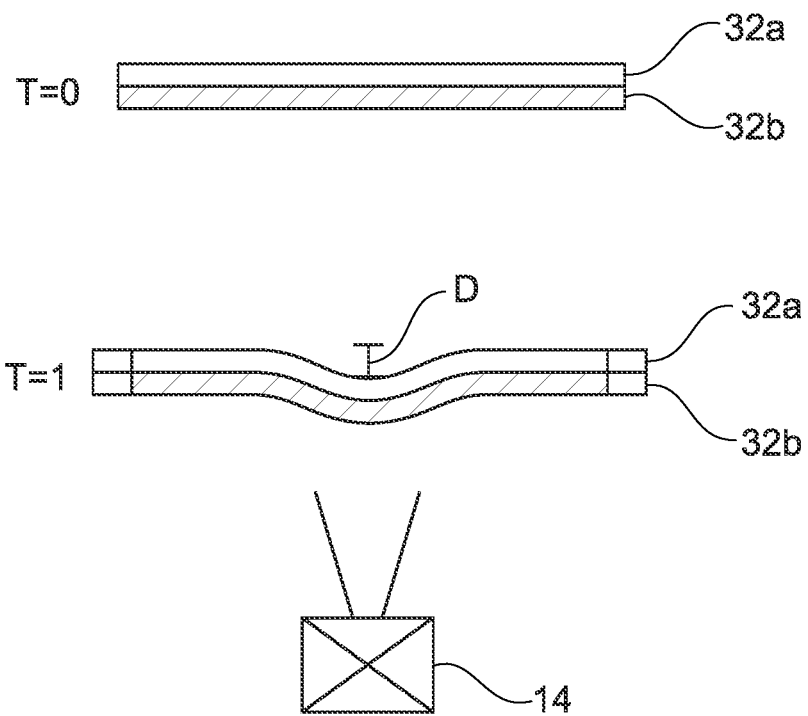
FIG. 2 schematically illustrates side cross-sectional views of the activation of a thermal bimorph polymer before and during illumination by infra-red radiation.

FIG. 2 schematically illustrates side cross-sectional views of the activation of a thermal bimorph polymer before and during illumination by infra-red radiation.

In an example, the writing implement 10 has a circular, ovular, square, rectangular, pentagonal, hexagonal, or heptagonal cross-section along at least a segment. The writing implement 10 is, for example, illustrated as an elongated object aligned along a longitudinal axis L, but this is not essential.

The form-factor of the elongate body 12 may change along the longitudinal axis L of the writing implement 10 to accommodate ergonomic variations or to enhance user comfort, for example (not illustrated).

In an example, the total length of the writing instrument 10 in the longitudinal direction L is between 50 mm and 200 mm, and specifically 140 mm. In an example, when the writing implement 10 has a circular cross-section, the maximum diameter of the writing implement is in the range of 6 mm to 20 mm, and specifically 9 mm. The elongate body of the writing implement 10 may, for example, comprise injection moulded from polystyrene or polypropylene.

In the illustrated example, the external surface of the writing instrument 10 comprises, near to its distal end D, a clip 11 for facilitating attachment to a user's pocket, for example. The writing implement 10 comprises, near to the proximal end, a user grip 19 comprised of a resilient material such as but not limited to rubber. The user grip 19 may be moulded to achieve an ergonomic match with a typical user profile, to enhance writing comfort.

At a high-level, the controller 16 is configured to receive signals from the various sensors of the writing instrument, and to generate a drive signal to activate or deactivate the source of infra-red radiation 14. The complexity of the controller 16 is related to the complexity of the control function required in an exemplary implementation of the writing implement, the type of haptic feedback that needs to be induced from the writing surface 30, which is in turn related to the control signal that drives the source of infra-red radiation 14.

For example, the control signal could be intended to emit near infra-red light at a frequency of 50 Hz and a duty cycle of 50% upon actuation of the first sensor 18. In this case, a controller capable of outputting a square wave having a frequency of 50 Hz as the control signal could be implemented in simple TTL or CMOS logic, or with a basic microcontroller such as a Microchip "PIC"™ or a basic ARM™ controller.

In another example, the control signal may be intended to modulate based on the pressure with which the first sensor 18 detects that the writing implement is being pushed against the writing surface 30. For example, haptic feedback having a low amplitude and a low frequency may continuously change to haptic feedback having a high amplitude and a high frequency, as the user progressively increases the pressure of the proximal end against the writing surface 30. In this case, the controller 16 may be implemented using an FPGA or a more complicated microcontroller or microprocessor, for example. In an example, the controller 16 is configured to execute an algorithm to generate pulse intensity variations based on the feedback from the first sensor 18, and/or the texture selector 22.

In an example, the controller 16 may comprise an accelerometer (not illustrated), for example at, or near to, the proximal end P of the writing instrument. The control signal may be modulated or chosen based on the detected velocity and/or direction of the proximal end of the writing instrument, as detected by the accelerometer.

In all embodiments, the controller may be provided with ancillary power supply, sensor, data modem and actuator interface electronics as known to a person skilled in the art.

In an example, the controller 16 may be communicably coupled to a memory element (not illustrated). The memory element may comprise a plurality of stored control signals for generating a respective plurality of haptic responses from a writing surface 30.

In an example, the power source 15 is an alkaline battery (such as a AAA or an AA battery), a lithium battery, a Li-ion battery, and the like. The battery may be embedded in the writing instrument, and either be disposable or rechargeable.

According to an embodiment, the source of infra-red radiation 14 comprises at least one infra-red micro LED, or wherein the source of infra-red radiation comprises a plurality of infra-red micro LEDs distributed around the proximal end of the writing instrument.

For example, a source of infra-red radiation 14 may form the tip 14 of the writing instrument, as illustrated in FIG. 1. In this case, the source of infra-red radiation 14 should be rigidly mounted to the elongate body 12 to enable a force from the active region 32 of the writing surface 30 to be transmitted to a user along the elongate body.

In an example, the source of infra-red radiation 14 may be located at another location in the elongate body 12, with a light waveguide provided to channel optical radiation towards a rigid tip provided at the proximal end of the pen.

Figure 8:
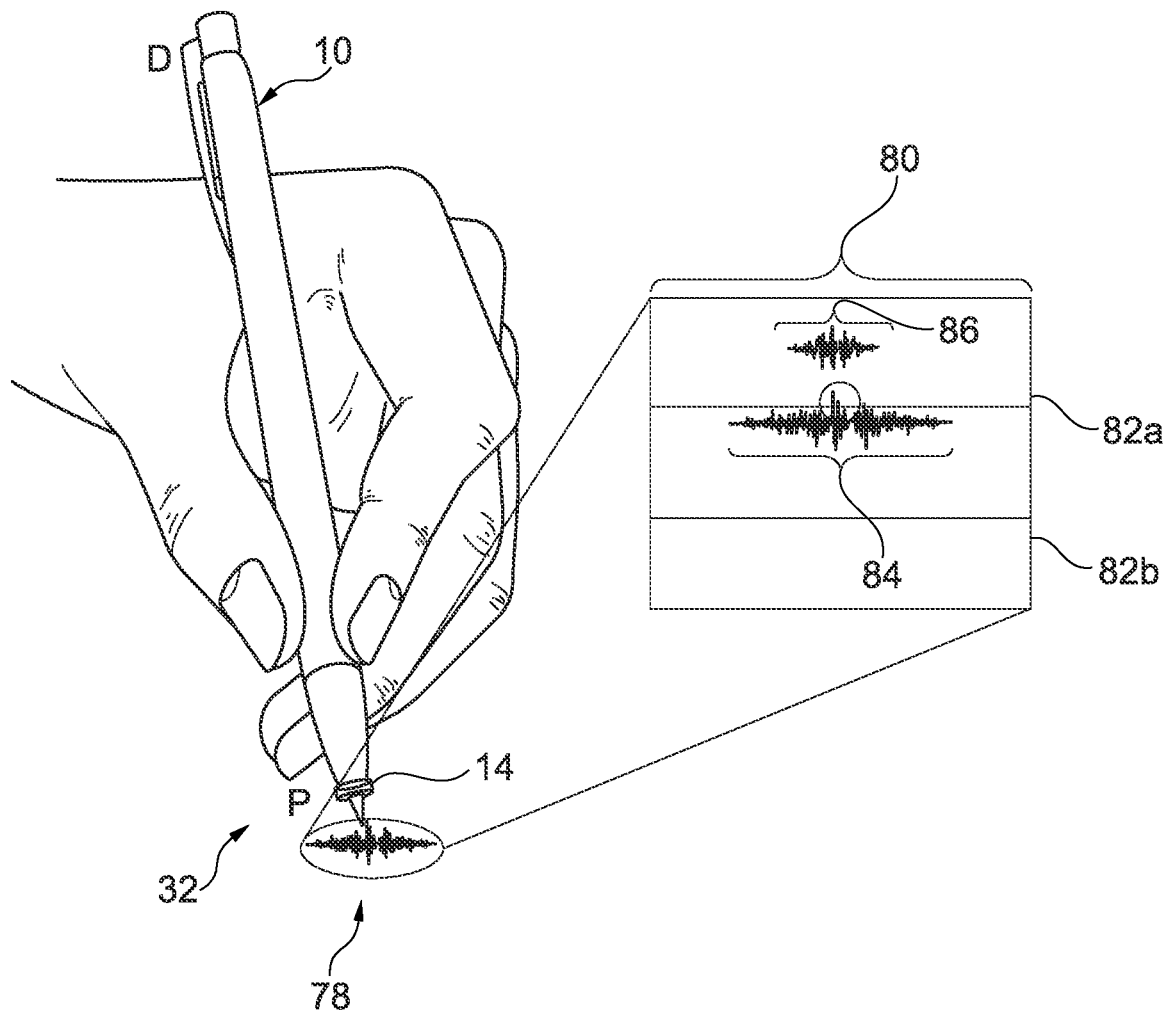
FIG. 8 schematically illustrates using a writing instrument with a writing surface.

In an example illustrated in FIG. 8, the source of infra-red radiation 14 may be disposed at a portion of the elongate body that is near the proximal end of the writing implement 10, but does not touch an active surface 32 in use. For example, the source of infra-red radiation 14 may be provided on a tapering body portion 12b. The source of infra-red radiation 14 may be provided as one, two, three, four, five, six, seven, eight, nine, ten, or more microLEDs disposed on or around the longitudinal axis of the writing instrument on the tapering body portion 12b, and directed at a focal point near to the proximal end of the writing instrument.

According to an embodiment, the infra-red radiation comprises a spectral maximum in the wavelength range 700 nm to 2500 nm, more specifically in the wavelength range 800 nm to 1500 nm, more specifically, the spectral maximum is in the wavelength range 800 nm to 1500 nm.

In an example, the infra-red radiation comprises a spectral maximum in a wavelength range suitable for activating a PEDOT-Tos material in the active region 32 of a writing surface, more specifically with a spectral peak substantially at, or centred on, 808 nm or 940 nm.

In an example, the infra-red radiation comprises a spectral maximum in a wavelength range suitable for activating a SiC/Si material in the active region 32 of a writing surface, more specifically with a spectral peak substantially at, or centred on, 1300 nm.

In an example, the infra-red radiation may comprise a spectral maximum in a wavelength range suitable for activating a liquid crystal elastomer (polysiloxane based liquid crystal elastomer) material in the active region 32 of a writing surface, more specifically with a spectral peak substantially at, or centred on, 808 nm or 940 nm.

In an example, the infra-red radiation may comprise a spectral maximum in a wavelength range suitable for activating an SU-8 material in the active region 32 of a writing surface.

In an example, the infra-red radiation may comprise a spectral maximum in a wavelength range suitable for activating a polyimide material in the active region 32 of a writing surface.

In an example, the infra-red radiation may comprise a spectral maximum in a wavelength range suitable for activating a polyimide material in the active region 32 of a writing surface.

In an example, the infra-red radiation comprises a spectral maximum in a wavelength range of between 750 nm to 3000 nm, 800-1000 nm, 1000 nm-1200 nm, 1200 nm-1400 nm, 1400 nm-1600 nm, 1600 nm-1800 nm, 1800 nm-2000 nm, 2000 nm-2200 nm, or 2200 nm-2400 nm.

In an example, the source of infra-red radiation 14 may comprise one or more microLEDs each having a power output of between 0 to 200 mW.

In an example, the source of infra-red radiation 14 may comprise one or more microLEDs each having a power density ranging between 1 to 10 $mWm^{-2}$.

In an example, the source of infra-red radiation 14 may comprise one or more microLEDs each having a diameter, or width, of between 4 μm and 30 μm.

In an example, the source of infra-red radiation 14 may comprise a plurality of microLEDs each spaced between 10 μm and 100 μm from each other.

In an example, the source of infra-red radiation 14 may comprise between 1 and 300 microLEDs comprised on the tapering body portion.

In an example, the source of infra-red radiation 14 may comprise a first group of infra-red radiation sources configured to emit infra-red or near-infra red light at a first wavelength range, and a second group of infra-red radiation sources configured to emit infra-red or near-infra red light at a second wavelength range. For example, the first wavelength range may be targeted to activate a PEDOT-Tos material, and the second wavelength range may be targeted to activate one or any combination of a SiC/Si material, a liquid crystal elastomer, a SU-8 material, and/or a polyimide material.

According to an embodiment, the proximal end further comprises an ink-emitting tip.

According to an embodiment, the writing instrument further comprises a first sensor 18 configured to detect that the writing instrument is near to, or in contact with, a writing surface. The first sensor 18 is configured to generate a proximity signal upon detecting that the writing instrument is near to, or in contact with, a writing surface 30. The controller 16 is configured to receive the proximity signal, and to generate the control signal in response.

According to an embodiment, the first sensor 18 is a pressure sensor, or a proximity sensor, disposed so as to be capable of sensing that the proximal end of the writing instrument in contact with, or is near to, an active region 32 of a writing surface 30.

For example, the first sensor 18 is a mechanical switch connected to a retractable portion of the elongate portion 12 or the tip 12b, that actuates when the writing instrument is brought into physical contact with a writing surface 30.

For example, the first sensor 18 is a non-contact capacitive proximity sensor, Hall-effect sensor, impedance sensor, or photoelectric proximity sensor disposed at, or near, the proximal end of the elongate portion 12 or the tip 12b.

In an example, the proximity signal is a binary signal defining either the state that the proximal end of the writing instrument is in contact, or is not in contact with an active portion 32 of a writing surface 30.

In an example, the proximity signal is a continuous signal defining the degree of pressure with which the proximal end of the writing instrument 10 is urged onto an active portion 32 of a writing surface 30 by a user.

In an example, assuming the use of a proximity sensor for detecting that the proximal end of the writing instrument is near to the active region of the writing surface, the term "near to" means that the proximal end of the writing instrument is within 5 mm, 4 mm, 3 mm, 2 mm, 1 mm, 0.5 mm, or 0.25 mm of the active region of the writing surface.

In an example, assuming the use of a pressure sensor for detecting that the proximal end of the writing instrument is near to the active region of the writing surface, a portion of the pressure sensor must contact the active region of the writing surface.

According to an embodiment, the writing instrument 10 further comprises a second sensor 20 configured to detect that a user is gripping the writing instrument. The second sensor 20 is configured to generate a grip signal upon detecting that the user is gripping the writing instrument. The controller 16 is configured to receive the grip signal, and to generate the control signal in response.

For example, the grip signal may be an electrical signal or data communication configured to initialize subsystems, such as the controller 16, prior to the proximal end of the writing instrument 10 touching the writing surface 30. This means that a user experiences no latency when beginning to write on the active writing surface.

According to an embodiment, the controller 16 is configured to generate the control signal so that the source of infra-red radiation 14 emits infra-red radiation having a substantially stationary spectral characteristic with respect to time.

Therefore, the haptic signal generated by the writing implement in this case has substantially constant spectral content over time. This simplifies the control signal needed for driving the source of infra-red radiation 14, and can still simulate a relatively accurate signal simulating, for example, the motion of a pen over a roughened paper surface. For example, the control signal may be sine wave, triangle wave, or square wave of constant frequency, or a band-limited noise signal, such as coloured noise.

According to an embodiment, the controller 16 is configured to output at least a first type of control signal and a second type of control signal to the source of infra-red radiation 14, thereby enabling the source of infra-red radiation 14 to emit infra-red radiation having at least first and second different intensity profiles at different points in time, respectively.

Therefore, the haptic signal generated by the writing implement 10 in this case may have at least two different spectral contents over time. For example, the control signal may be two different types of noise signal, such as coloured noise and white noise. Alternatively or in addition, the amplitude of the second type of control signal may increase, to cause a momentary larger haptic response in the writing implement 10 signifying the motion of the tip of the writing implement 10 over a line on a page of writing paper.

According to an embodiment, the writing instrument 10 further comprises a texture selector 22 accessible to a user of the writing instrument 10 and operatively coupled to the controller 16. The texture selector 22 is configured to receive at least one of a first and a second texture setting from the user, and to transmit either the first or the second texture settings to the controller 16. The first type of control signal or the second type of control signal are selected based on the first and a second texture setting input by the user.

For example, the use may select between a "paper" texture or a "sandpaper" texture. Each selection causes the controller to generate a different type of control signal with a different pulse characteristic.

In a first example, a first type of control signal and a second type of control signal may vary in frequency. For example, the first type of control signal may be a square wave at 50 Hz, and the second type of control signal may be a square wave at 100 Hz.

In a second example, a first type of control signal and a second type of control signal may vary in amplitude (in other words, eventual intensity of the radiation emitted from the source of infra-red radiation 14). For example, the first type of control signal may be a square wave at half the magnitude compared to the second type of control signal.

In a third example, a first type of control signal and a second type of control signal may vary in shape. For example, the first type of control signal may be a square wave, and the second type of control signal may be a sine wave.

In a fourth example, the first type of control signal and the second type of control signals are non-stationary signals.

In a fifth example, whether or not a first type of control signal or a second type of control signal are chosen may depend on a selection made by the texture selector 22, and/or an accelerometer located, for example, at the proximal end of the writing instrument.

In a sixth example, the first type of control signal is a stationary signal, and the second type of control signal is a non-stationary signals.

A skilled person will appreciate that a wide range of stationary and non-stationary signals may be provided, dependent on the haptic phenomena that it is intended to induce in the writing instrument 10. The signals may be recorded from authentic writing surfaces. In an example, the signals may be synthetic.

The texture selector control may be located on any region of the pen body. In an example, the texture selector is a potentiometer-controlled rotary or slide member capable of generating a continuously varying voltage. For example, a specific voltage value may correspond to a predefined microLED pulse frequency or infra-red light power. In an example, the texture selector 22 may comprise a multiple push-button or capacitively sensed region along the pen body axis, a rotatable selection ring around the pen body, or a slide able to slide in a longitudinal direction of the pen body. As will be explained subsequently, the texture selector 22 may also be provided on a smartphone application, with the texture selection transmitted to the writing instrument via data modem 24.

According to an example, the writing instrument 10 is provided with a display 23 capable of indicating to a user the current texture configuration. The display may be an OLED strip, one or more LEDs, and the like.

According to an embodiment, the writing instrument 10 further comprises a data modem 24 operatively coupled to the controller 16. The controller 16 is configured to receive one or more configuration data records, and/or tactile feedback data, from the data modem.

For example, the data modem 24 of the writing instrument is a modem compatible with one or more of the Bluetooth™, Bluetooth Low Energy™ (802.15.1), WiFi™ (802.11g), near field communications (NFC, as defined by ISO 13157) standards, and others. The data modem is capable of receiving control and haptic waveform data from a remote wireless data modem, for example in an apparatus 50 such as a smartphone, via a WiFi base station, or via a data modem 38 of a writing surface, as discussed herein. The controller 16 of the writing instrument is provided with appropriate chipset and interface circuitry to implement the required interface to the data modem 24. The data modem 24 is operably coupled to an appropriate antenna element (not illustrated).

The controller 16 is configured to generate the control signal for the source of infra-red radiation 14 based, at least in part, on the one or more configuration data records, and/or tactile feedback data received by the data modem.

For example, the controller 16 and a control unit 35 of a writing surface 30, or an apparatus 50, may establish a data link enabling one or both of the writing surface 30, or the apparatus 50 to communicate control signals to the controller 16 of the writing instrument. In an example, the control signals may be customized based on the type of thermal bimorph polymer present in the active region 32 of the writing surface.

According to a variation of the preceding embodiments (not illustrated), the proximal end P of the writing instrument 10 further may comprise a portion of thermal bimorph polymer material with an optical coupling to the source of infra-red radiation 14. The portion of thermal bimorph polymer material is disposed at the proximal end P of the writing instrument 10 so that, in use, the thermal bimorph polymer material at the proximal end P of the writing instrument 10 contacts a writing surface. The thermal bimorph polymer material at the proximal end P of the writing instrument 10 is configured to induce a haptic sensation into the elongate body portion 12 when activated by the source of infra-red radiation 14.

According to this variation, a haptic feedback sensation may be provided to a user without needing a special writing surface comprising a thermal bimorph polymer.

Figure 3:
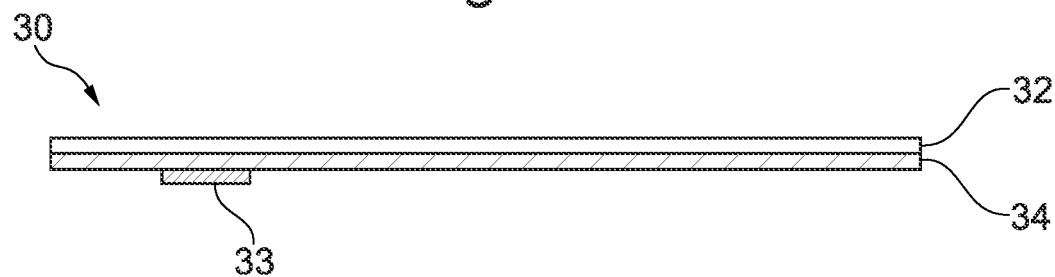
FIG. 3 schematically illustrates a cross-section of a writing surface.

FIG. 3 schematically illustrates a cross-section of a writing surface.

According to a second aspect, there is provided a writing surface 30 for use with a writing instrument 10 configured to provide tactile feedback to a user. The writing surface 30 comprises a substrate 34 and an active region 32 disposed on at least a portion of the substrate.

The active region 32 comprises a thermal bimorph polymer material capable of being activated by infra-red radiation. In an example, the thermal bimorph polymer material is activated by infra-red radiation comprising a spectral maximum in the wavelength range 700 nm to 2500 nm. the thermal bimorph polymer material is activated by infra-red radiation comprising a spectral maximum in the wavelength ranges of between 750 nm to 3000 nm, 800-1000 nm, 1000 nm-1200 nm, 1200 nm-1400 nm, 1400 nm-1600 nm, 1600 nm-1800 nm, 1800 nm-2000 nm, 2000 nm-2200 nm, or 2200 nm-2400 nm.

Upon irradiation by near infra-red light, the active region 32 absorbs light energy and converts it into a thermoelastic bending deformation due to the mismatch in the coefficient of thermal expansion between the coating and the substrate. The light induced vibration/texture feeling is produced by a reversible heating and cooling process in the thermal bimorph polymer by the continuous intensity variation (which may be an on-off variation characterised by a square wave, or a smoother variation such as a sine, ramp, or specifically designed signal). The continuous irradiation by infra-red or near infra-red light generates a thermoelastic bending deformation. The temperature of the actuator increases in a relationship to the integral of the continuous intensity variation with respect to time. During times when less, or no, light is irradiated, heat dissipation from the active region 32 occurs by convection to the atmosphere (as shown in FIG. 2)

According to an embodiment, the active region 32 may comprise at least a thermally active first polymer layer 32a conjoined with a second polymer layer 32b, wherein a thermoelastic bending deformation coefficient of the first polymer layer is different to a thermoelastic bending deformation coefficient of the second polymer layer, such that a physical deformation or vibration occurs in the active region upon application of infra-red radiation in a wavelength range capable of activating at least the first polymer layer.

According to an embodiment, the active region 32 may comprise a thermal bimorph polymer material comprising a PEDOT-Tos layer conjoined with a PET layer. Alternatively, the active region 32 comprises a thermal bimorph polymer material comprising a Si layer conjoined with a SiC layer or an Al layer.

According to an embodiment, the average thickness of the thermal bimorph polymer coating 32a ranges between 100 nanometres to 5 micrometres. According to an embodiment, the thickness of the bimorph material substrate 32b can range between 10 micrometres to 100 micrometres.

According to an embodiment, the thermal bimorph polymer coating and/or substrate 32a,b is configured to vibrate under light-induced thermal deformation with a frequency ranging between 100 Hz to 400 Hz.

According to an embodiment, the thermal bimorph polymer coating and/or substrate 32a,b is deposited by PECVD, electropolymerization, or spin coating.

According to an embodiment, the active region 32 comprises a SU-8 coating conjoined with a Si layer. According to an embodiment, the active region 32 comprises a polyimide coating conjoined with a layer comprising polyvinyl difluorides with tetrafluoroethylene.

Figure 7:
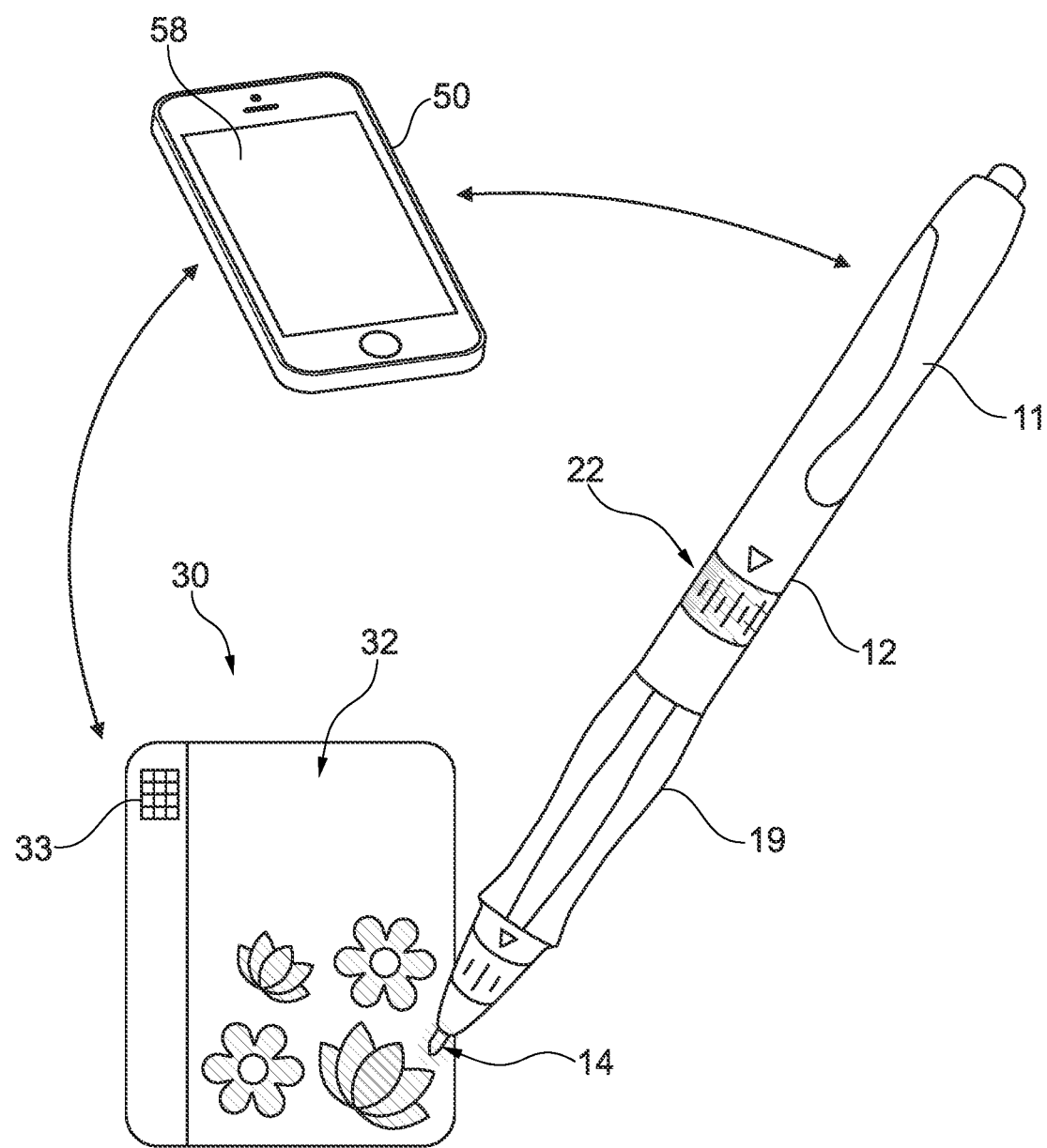
FIG. 7 schematically illustrates using a writing instrument, an apparatus, and a writing surface.

The active region 32 may be provided as an outer layer of a reusable notebook with a plurality of pages, a single sheet writing surface, a tablet, a writing slate, board, or a disposable film. The active region 32 (thermal bimorph polymer) may be disposed over the entire writing area, on a pattern of points homogeneously distributed along the writing surface with a spacing of between 10 micrometres to 1000 micrometres, or along a specific path, such as a ruled line on a page. FIG. 7 schematically illustrates a writing surface 30 having an active region 32 comprising specific shapes.

Therefore, in one aspect, the writing surface 30 may be an un-powered item having no electronics, because the active region 32 does not require electrical stimulation to generate haptic feedback. The writing surface 30 may comprise an optical identifier 33 such as a QR code readable via a smartphone application. The QR code may enable a smartphone application to program the writing instrument with a suitable haptic feedback pattern via data communication with the data modem 24 of the writing instrument.

According to an embodiment, the writing surface 30 is one of a rigid tablet, wherein at least a portion of the rigid tablet is the substrate and comprises thereon the active region, a reusable notebook comprising at least one page having the active region, or a disposable film.

According to an embodiment, the writing surface further comprises a control unit 35. The control unit comprises a data memory 36, a data modem 38, a processor 40, and an electrical power source 42 configured to provide electrical energy to at least the data memory, the data modem, and the processor.

The data memory is configured to store a configuration data record characterising at least one of: the type of thermal bimorph polymer comprised in the active region 32 of the writing surface, the spatial extent of the active region of the writing surface, and/or spatial texture information defining one or more textures that should be provided as tactile feedback to a user of a writing instrument. In use, the processor is configured to obtain the configuration data record from the data memory, and to transmit the configuration data record to a data modem 24 of a writing instrument 10 via the data modem of the writing surface.

The control unit 35 and its data memory 36, data modem 38, processor 40, and electronic power source 42 may be comprised of similar or corresponding elements as discussed above in relation to the controller 16 and associated electronics of the writing instrument, or similar variants.

Figure 4:
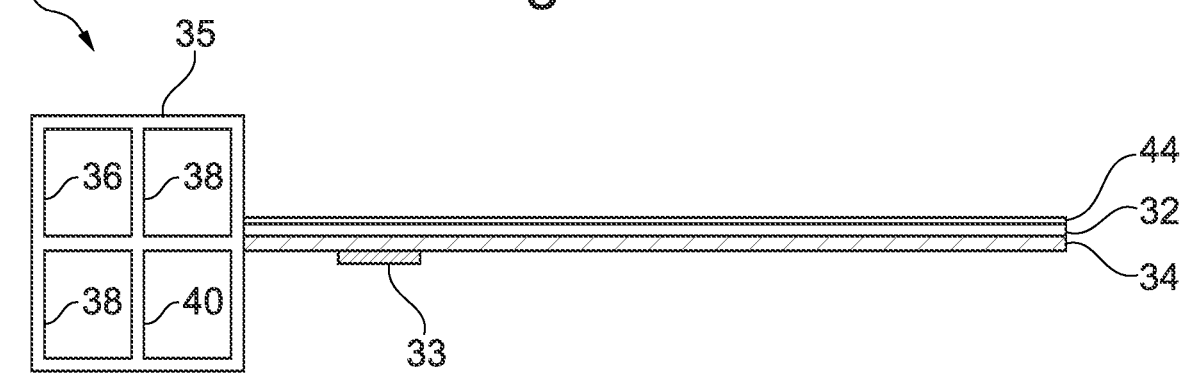
FIG. 4 schematically illustrates a cross-section of a writing surface comprising a control unit.

FIG. 4 schematically illustrates a cross-section of a writing surface comprising a control unit.

Accordingly, the writing surface 30 and the writing implement 10 may be configured to communicate data between each other via data transfer between their respective data modems 38 and 24. For example, the configuration data record may comprise a preset signal identifying what type of haptic feedback the writing instrument 10 should provide. In this embodiment, the controller 16 of the writing instrument is configured to detect the presence of a new writing surface 30, and to interrogate the control unit 31 of the writing surface 30 to obtain the configuration data record which enables the writing instrument 10 to provide an intended haptic signal. For example, the configuration data record may define a location on the writing surface where a texture or lined pattern is required.

According to an embodiment, the writing surface further comprises a location sensing layer 44 operatively coupled to the processor. The location sensing layer is spatially coincident with at least a portion of the active region 32 comprising the thermal bimorph polymer material.

The location sensing layer is configured to localize the location of the proximal end P of a writing instrument 10 relative to the active region, and to output to the processor 40 location data characterising a current location of the proximal end of the writing instrument. The processor is configured to generate tactile feedback data based on the location data, and to transmit the tactile feedback data to a data modem 24 of a writing instrument 10 via the data modem 38 of the writing surface, and/or wherein the processor is configured to transmit the location data to the writing instrument via the data modem of the writing surface.

According to this embodiment, a location sensing layer 44 such as a capacitive sensing layer may detect the location of the proximal end P of a writing implement 10 as it is traced over the writing surface 30. The control unit 35 of the writing surface 30 may sample the location sensing layer 44 and resolve the location of the proximal end P of the writing implement 10 in substantially real-time. In one example, the control unit 35 of the writing surface 30 may determine, based on interrogating a texture map stored in the data memory 36 of the control unit 31, a haptic feedback that should be generated by the writing implement 10 when the proximal end P is at the resolved location of the writing surface 30. The texture map may be, for example, a data record that is indexed according to a 2D coordinate representing locations on the writing surface, with each 2D location comprising a haptic signal definition. The haptic signal definition could, for example, define the haptic signal shape, amplitude, and/or frequency required at a given 2D location. The control unit 35 of the writing surface 30 may transmit the desired texture to the controller 16 of the writing implement 10 as a configuration data record. Alternatively, the control unit 35 of the writing surface 30 may transmit the resolved 2D location of the proximal end P on the writing surface to the writing implement 10, and the writing implement 10 may consult a texture map stored on a memory in the controller 16. In some cases, the texture map may be downloaded from the writing surface 30 to the controller 16 of the writing instrument prior to use.

According to a third aspect, there is provided an apparatus 50 comprising a data memory 52, a data modem 54, a processor 56, and a visual interface 58.

The processor 56 of the apparatus 50 may be configured to communicate, via the data modem 54 with a controller of a writing instrument according to the first aspect or its embodiments.

The processor 56 of the apparatus 50 may be configured to communicate, via the data modem, with a processor 40 of a writing surface 30 according to the second aspect, or its embodiments.

The processor 56 may be configured to operate in a first mode, comprising communicating with the processor of the writing surface to obtain the configuration data record defining the writing surface, and transmitting the configuration data record to the controller of the writing instrument based on the data record defining the writing surface.

Alternatively or in addition, the processor 56 may be configured to operate in a second mode, comprising obtaining from the user application executed on the processor and displayed on the visual interface 58 of the apparatus 50, a spatial configuration and/or a texture configuration, generating a configuration data record based on the spatial configuration and/or a texture configuration provided by the user, and transmitting the configuration data record to the controller 16 of the writing instrument.

The apparatus may be, for example, a smartphone, tablet computer, laptop or desktop computer, smartwatch, and the like.

Figure 5:
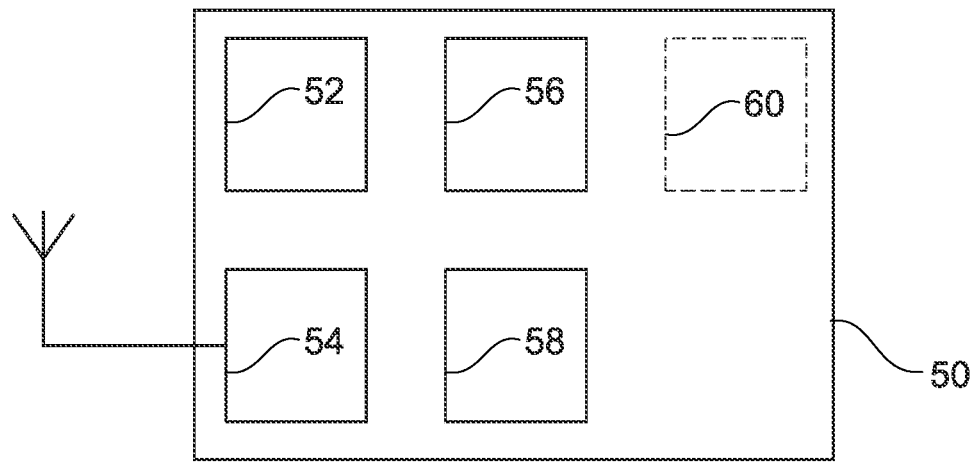
FIG. 5 schematically illustrates an apparatus for use with a writing instrument and/or a writing surface.

FIG. 5 schematically illustrates an apparatus for use with a writing instrument and/or a writing surface. The apparatus 50 may comprise, for example, a data memory 52, a data modem 54, a processor 56, a visual interface 58 (such as a touchscreen). In examples, the apparatus 50 comprises a camera.

According to an embodiment of the third aspect, the apparatus 50 further comprises a camera 60. The apparatus is configured to image a visual identifier 46 attached to the writing surface, to generate a configuration record based on the imaged visual identifier, and to transmit the configuration data record to the controller 16 of the writing instrument 30.

According to a fourth aspect, there is provided a writing system 62 configured to provide tactile feedback to a user, comprising a writing instrument 10 according to the first aspect or its embodiments, and a writing surface 30 according to the second aspect or its embodiments.

Figure 6:
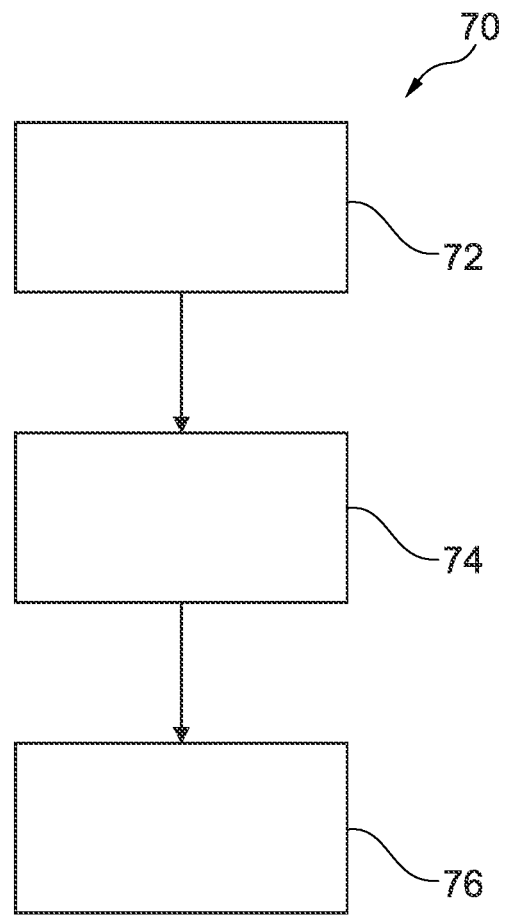
FIG. 6 schematically illustrates a method of a writing instrument.

FIG. 6 schematically illustrates a method of a writing instrument according to the fifth aspect.

According to a fifth aspect, there is provided a method 70 for writing on a writing surface using a writing instrument configured to provide tactile feedback to a user. The method comprises:

- orienting 72 a writing instrument 10 according to the first aspect or its embodiments, such that the proximal end P of the writing instrument emits, in use, infra-red radiation that is incident on an active region of a writing surface according to the second aspect, or its embodiments;
- generating 74 a control signal for controlling the source of infra-red radiation; and
- displacing 76 the writing instrument across the active region, thereby activating the thermal bimorph polymer material comprised in the active region of the writing surface to generate tactile feedback.

FIG. 7 schematically illustrates using a writing instrument, an apparatus, and a writing surface. In one example, the apparatus 50 may read an optical indication 33 such as a QR code to identify a specific type of writing tablet 30. The optical indication 33 may enable the apparatus 50 to interrogate a remote server to identify the haptic signal pattern and/or a relevant texture map of the writing surface 30. The apparatus 50 may, in example, provide a menu to a user via the visual interface 58 enabling a user to choose a haptic feedback configuration via the visual interface 58. Once an appropriate texture map of the writing surface 30 has been obtained from a server or programmed by a user, the texture map of the writing surface 30 is downloaded to the writing instrument 10.

FIG. 8 schematically illustrates another example of using a writing instrument with a writing surface. In this case, the source of infra-red light 14 activates an active region 32 disposed on a lined writing surface 78. The inset 80 illustrates lines 82a, 82b. As the writing instrument writes in a gap between the lines, a second haptic signal having a low amplitude may be generated by the writing implement 10. As the proximal end P of the writing implement approaches the line 82a, a first haptic signal 84 may be generated, to signal to a user that the proximal end P is near to the line 82a.

According to a further aspect, there is provided a computer program element comprising machine-executable instructions which cause an apparatus 50 comprising a data memory 52, a data modem 54, a processor 56, and a visual interface 58 to communicate, via the data modem 54 with a controller of a writing instrument according to the first aspect or its embodiments, and/or to cause the processor 56 of the apparatus 50 to communicate, via the data modem, with a processor 40 of a writing surface 30 according to the second aspect, or its embodiments. In an example, the computer program element causes the processor 56 to operate in a first mode, comprising communicating with the processor of the writing surface to obtain the configuration data record defining the writing surface, and transmitting the configuration data record to the controller of the writing instrument based on the data record defining the writing surface.

Alternatively or in addition, the computer program element may cause the processor 56 to operate in a second mode, comprising obtaining from the user application executed on the processor and displayed on the visual interface 58 of the apparatus 50, a spatial configuration and/or a texture configuration, generating a configuration data record based on the spatial configuration and/or a texture configuration provided by the user, and transmitting the configuration data record to the controller 16 of the writing instrument.

According to a further aspect, there is provided a computer readable medium comprising the computer program element discussed above.

According to a further aspect, there is provided a tablet computer, e-book, or smartphone configured to provide tactile feedback to a user, wherein a surface of the tablet computer, e-book, or smartphone comprise a writing surface 30 according to the second aspect, or its embodiments.

References throughout the preceding specification to "one embodiment", "an embodiment", "one example" or "an example", "one aspect" or "an aspect" means that a particular feature, structure, or characteristic described in connection with the embodiment or example is included in at least one embodiment of the present disclosure. Thus, appearances of the phrases "in one embodiment", "in an embodiment", "one example" or "an example", "one aspect" or "an aspect" in various places throughout this specification are not necessarily all referring to the same embodiment or example.

Furthermore, the particular features, structures, or characteristics may be combined in any suitable combinations and/or sub-combinations in one or more embodiments or examples.

REFERENCE NUMERALS

P Proximal End
D Distal End
10 Writing instrument
11 Clip
12 Elongate body portion
12a Main body portion
12b Tapering body portion
14 Source of infra-red radiation
15 Power source
16 Controller
18 First sensor
19 User grip
20 Second sensor
22 Texture selector
23 Display
24 Data modem of writing instrument
30 Writing Surface
31 Control unit
32 Active Region
32a Thermally active first polymer layer
32b Second polymer layer
33 Optical identifier
34 Substrate
35 Control unit
36 Data memory of writing surface
38 Data modem of writing surface
40 Processor of writing surface
42 Electrical power source of writing surface
44 Location sensing layer of writing surface
46 Visual identifier
50 Apparatus
52 Data memory of apparatus
54 Data modem of apparatus
56 Processor of apparatus
58 Visual interface of apparatus
60 Camera
62 Writing System
70 Method
72 Orienting . . .
74 Generating . . .
76 Displacing . . .
78 Lined writing surface
80 Inset
82a,b Lines
84 First haptic signal
86 Second haptic signal

The invention claimed is:

1. A writing instrument configured to provide tactile feedback to a user, comprising:
an elongate body portion enabling the user to grip the writing instrument, wherein the body portion comprises a proximal end and a distal end, the proximal end comprising at least a source of infra-red radiation configured to illuminate, in use, an active region of a writing surface; and
a controller configured to generate a control signal for controlling the source of the infra-red radiation;
wherein, upon being driven by the control signal, the source of the infra-red radiation is configured to emit the infra-red radiation having a spectral maximum in a wavelength range capable of activating a thermal bimorph polymer material, and wherein, in use, the proximal end of the writing instrument, when in contact with the active region of the writing surface, is configured to transfer a tactile impulse generated by the active region of the writing surface to the user of the writing instrument via the elongate body portion.

2. The writing instrument of claim 1, wherein the infra-red radiation comprises the spectral maximum in the wavelength range 700 nm to 2500 nm.

3. The writing instrument of claim 1, wherein the source of the infra-red radiation comprises at least one infra-red micro LED, or wherein the source of the infra-red radiation comprises a plurality of infra-red micro LEDs distributed around the proximal end of the writing instrument.

4. The writing instrument of claim 3, further comprising:
a first sensor configured to detect that the writing instrument is near to, or in contact with, the writing surface, wherein the first sensor is configured to generate a proximity signal upon detecting that the writing instrument is near to, or in contact with, the writing surface; and
wherein the controller is configured to receive the proximity signal, and to generate the control signal in response.

5. The writing instrument of claim 4, wherein the first sensor is a pressure sensor, or a proximity sensor, disposed so as to be capable of sensing that the proximal end of the writing instrument is in contact with, or near to, the active region of the writing surface.

6. The writing instrument of claim 1, wherein the controller is configured to output at least a first type of control signal and a second type of control signal to the source of the infra-red radiation, thereby enabling the source of the infra-red radiation to emit the infra-red radiation having at least first and second different intensity profiles at different points in time, respectively, and/or wherein the writing instrument further comprises:
a texture selector accessible to the user of the writing instrument and operatively coupled to the controller;
wherein the texture selector is configured to receive at least one of a first and a second texture setting from the user, and to transmit either the first or the second texture settings to the controller, wherein the first type of control signal or the second type of control signal are selected based on the first and a second texture setting input by the user.

7. The writing instrument of claim 1, further comprising:
a data modem operatively coupled to the controller;
wherein the controller is configured to receive one or more configuration data records, and/or tactile feedback data, from the data modem; and
wherein the controller is configured to generate the control signal for the source of the infra-red radiation based, at least in part, on the one or more configuration data records, and/or tactile feedback data received by the data modem.

8. The writing instrument of claim 1, further comprising:
an electrical power source configured to provide electrical energy to one or more electrical elements within the writing instrument.

9. The writing instrument of claim 1, further comprising:
a display configured to indicate current texture configuration to the user.

10. The writing instrument of claim 1, further comprising:
a second sensor configured to generate a grip signal upon detecting the grip of the writing instrument by the user, wherein the controller is configured to receive the grip signal and generates the control signal.

11. The writing instrument of claim 1, wherein a deformation of the active region of the writing surface in response to an exposure to the infra-red radiation exerts a force against the proximal end of the writing instrument held in mechanical contact with the active region causing the user to perceive a physical discontinuity on the writing surface.

12. A writing surface for use with a writing instrument configured to provide tactile feedback to a user, comprising:
a substrate; and
an active region disposed on at least a portion of the substrate;
wherein the active region comprises a thermal bimorph polymer material capable of being activated by infra-red radiation.

13. The writing surface of claim 12, wherein the active region comprises at least a thermally active first polymer layer conjoined with a second polymer layer, wherein a thermoelastic bending deformation coefficient of the first polymer layer is different to the thermoelastic bending deformation coefficient of the second polymer layer, such that a physical deformation or vibration occurs in the active region upon application of the infra-red radiation in a wavelength range capable of activating at least the first polymer layer.

14. The writing surface of claim 12, wherein the active region comprises the thermal bimorph polymer material selected from:
a PEDOT-Tos layer conjoined with a PET layer; or
a Si layer conjoined with a SiC layer or an Al layer.

15. The writing surface of claim 12, further comprising a control unit, the control unit comprising:
a data memory;
a data modem;
a processor; and
an electrical power source configured to provide electrical energy to at least the data memory, the data modem, and the processor;
wherein the data memory is configured to store a configuration data record characterising at least one of: type of thermal bimorph polymer comprised in the active region of the writing surface, spatial extent of the active region of the writing surface, and/or spatial texture information defining one or more textures that should be provided as the tactile feedback to the user of the writing instrument; and
wherein, in use, the processor is configured to obtain the configuration data record from the data memory, and to transmit the configuration data record to the data modem of the writing instrument via the data modem of the writing surface.

16. The writing surface of claim 15, further comprising:
a location sensing layer operatively coupled to the processor;
wherein the location sensing layer is spatially coincident with at least a portion of the active region comprising the thermal bimorph polymer material;
wherein the location sensing layer is configured to localize the location of a proximal end of the writing instrument relative to the active region, and to output to a processor location data characterising a current location of the proximal end of the writing instrument; and
wherein the processor is configured to generate tactile feedback data based on the location data, and to transmit the tactile feedback data to the data modem of the writing instrument via the data modem of the writing surface, and/or wherein the processor is configured to transmit the location data to the writing instrument via the data modem of the writing surface.

17. The writing surface of claim 15, further comprising:
an optical identifier configured to interrogate a remote server to identify a haptic signal pattern and/or a relevant texture map of the writing surface, wherein the optical identifier enables an application, via a data communication, to program the writing instrument with a haptic feedback pattern.

18. An apparatus comprising:
a data memory;
a data modem;
a processor;
a visual interface;
an elongate body portion enabling a user to grip a writing instrument, wherein the body portion comprises a proximal end and a distal end, the proximal end comprising at least a source of infra-red radiation configured to illuminate, in use, an active region of a writing surface; and
a controller configured to generate a control signal for controlling the source of the infra-red radiation;
wherein the processor of the apparatus is configured to communicate, via the data modem, with a controller of the writing instrument;
wherein the processor of the apparatus is configured to communicate, via the data modem, with the processor of the writing surface; and
wherein the processor is configured to operate in a first mode, comprising communicating with the processor of the writing surface to obtain configuration data record defining the writing surface, and transmitting the configuration data record to the controller of the writing instrument based on the data record defining the writing surface; or
wherein the processor is configured to operate in a second mode, comprising obtaining from user application executed on the processor and displayed on the visual interface of the apparatus, a spatial configuration and/or a texture configuration, generating the configuration data record based on the spatial configuration and/or the texture configuration provided by the user, and transmitting the configuration data record to the controller of the writing instrument, wherein, upon being driven by the control signal, the source of the infra-red radiation is configured to emit the infra-red radiation having a spectral maximum in a wavelength range capable of activating a thermal bimorph polymer material, and wherein, in use, the proximal end of the writing instrument, when in contact with the active region of the writing surface, is configured to transfer a tactile impulse generated by the active region of the writing surface to the user of the writing instrument via the elongate body portion.

19. The apparatus of claim 18, wherein the writing surface comprises:
an electrical power source configured to provide electrical energy to at least the data memory, the data modem, and the processor;
wherein the data memory is configured to store the configuration data record characterising at least one of: type of thermal bimorph polymer comprised in an active region of the writing surface, spatial extent of the active region of the writing surface, and/or spatial texture information defining one or more textures that should be provided as a tactile feedback to the user of the writing instrument; and
wherein, in use, the processor is configured to obtain the configuration data record from the data memory, and to transmit the configuration data record to the data modem of the writing instrument via the data modem of the writing surface.

* * * * *